United States Patent
Wu

(10) Patent No.: US 7,290,877 B1
(45) Date of Patent: Nov. 6, 2007

(54) MULTI-LENS VISION CORRECTION METHOD AND ITS APPARATUS

(76) Inventor: Hong-Hsiang Wu, P.O. Box 24-108, Taipei (TW)

( * ) Notice: Subject to any disclaimer, the term of this patent is extended or adjusted under 35 U.S.C. 154(b) by 0 days.

(21) Appl. No.: 11/438,144

(22) Filed: May 22, 2006

(51) Int. Cl.
*G02C 7/06* (2006.01)
(52) U.S. Cl. .................................... 351/177; 351/168
(58) Field of Classification Search ............... 351/161, 351/168–172, 177
See application file for complete search history.

(56) References Cited

U.S. PATENT DOCUMENTS 4,988,185 A * 1/1991 Feinbloom ................. 351/233

* cited by examiner

*Primary Examiner*—Scott J. Sugarman

(57) ABSTRACT

The present invention discloses a multi-lens vision correction method and its apparatus that use two lenses to form a lens module as a basic structure, and a lens closer to an eye is a concave lens preferably disposed close to the eye as much as possible for correcting the focusing, so that a myopic person can see an object at a far distance. The invention also corrects myopia with excessive minus optical power compensation, and the lens at a distance farther from the eye is a convex lens having opposite characteristics with the lens at a distance closer to the eye according to the excessive compensation, and the invention uses and selects a lens combination with appropriate optical power, so that the final image is produced at a position closer to the front along the central optic axis, and the virtual image of an object converted by the lens module is designed, controlled and converted at a farther distance to change the previous habit of a user. The visual environment of a myopic person is extended from a short distance to a longer distance, and the person's eyes can sense a farther and bigger object, and the Ciliary Body and Lens move to the focus and form a final image at the Retina, unlike the movement made by naked eyes to observe an object. The myopic persons will use their eyesight to view objects at a zone farther than the actual distance. By a natural operation of the physiology of sight and balance of users' habit, pseudomyopia can be balanced and abnormal elongation of the axial length of an eye due to bad habits can be stopped, and thus achieving a vision correction effect.

4 Claims, 4 Drawing Sheets

Ratio of d(Deye_c)/d(oZ) for the lens combinations A, B and C

Ratio of HiExa/HoA among the lens combinations A, B and C

MULTI-LENS VISION CORRECTION METHOD AND ITS APPARATUS

BACKGROUND OF THE INVENTION

1. Field of the Invention

The present invention relates to a multi-lens vision correction method and its apparatus that adopt a non-surgical method to correct focusing images on a Retina of a person to solve a myopia problem caused by the person's habits. In addition to providing a tool for recovering a person's normal vision, the invention also keeps the Ciliary Body and Lens of the person's eyes operated in a range of sight with a relatively far distance to change an old bad habit of getting used to a narrower visual environment and prevent the myopia problem caused by the bad habit from being deteriorated. If a person has a pseudomyopia problem, then the normal naked eye's vision can be recovered gradually by using the method of the invention. A lens module having two lenses is used as a basic structure, and a concave lens is used at a position closer to an eye and preferably having the smallest feasible distance from the eye to correct the focusing of an eyesight and let people see an object at a far distance. The lens, closer to the eye, of the invention also corrects the eyesight with excessive minus optical power compensation, and the lens at a distance farther from the eye is a convex lens having opposite optical power characteristics with the lens at a distance closer to the eye according to the excessive compensation, and the invention uses and selects a lens combination with appropriate optical power, so that the final image can be produced at a position closer to the front along the central optic axis, and the virtual image of an object converted by the lens module can be designed, controlled and converted at a farther distance to change the old habit of a person. The visual environment of a myopic person is extended from a short distance to a longer distance, and the myopic person's eyes can sense a farther and bigger object, and the Ciliary Body and Lens can move properly to the focus and form a final image at the Retina, unlike the general movement made by naked eyes to observe an object. The myopic person will use their eyesight to view objects at a zone farther than the actual distance. With the application of the present invention, the perceived space will be apparently larger than the real space. An eye will therefore accommodate differently by Ciliary Muscles in such a perceived environment with clear eyesight. By a natural correction with the physiology of sight and balance of users' habit by changing one's visual environment, pseudomyopia can be balanced and abnormal elongation of the axial length of an eye due to bad habits can be stopped, and thus achieving a vision correction effect.

2. Description of the Related Art

According to the principle of the physiology of sight, extrinsic muscles control an eyeball to be aligned with the optic axis of an object, and after a visible light is bombarded at and reflected from the object, the light passes through a Cornea, an Anterior Chamber and an Aqueous Humor in a Posterior Chamber, a Lens, and a Vitreous Body contained in a Sclera to form an inverted real image on a Retina. If the image produced on the Retina cannot be focused, then involuntary muscles in a Ciliary Body receive an instruction given by Oculomotor Nerves to move and change the shape of the Lens to change its optical power until the image can be focused clearly, and then the Retina senses an image signal, and the Optic Nerves send the image signal for the interpretation of the image by a cerebrum for further information processing.

There are many reasons that myopia cannot be improved, and one of the reasons is a person's bad habit of using eyes because of staying in a narrower visual environment and getting used to the narrow visual environment. Since an abnormal use of eyes causes the muscle in the Ciliary Body to be used continuously in a particular direction, so that the muscle itself and the eye Lens may be used excessively and cannot restore themselves naturally. Pseudomyopia is caused by a convulsion or a cramp of the Ciliary Muscles that controls the near vision, and thus an excessively accommodated Lens cannot release the convulsion. If a person keeps doing the same as described above for a long time, the axial length of the eyeballs will be elongated, particularly at the stage of a physiological development of the eyeballs and vision. If a person does not pay attention to such bad habit, the final image can no longer be focused on the Retina anymore, and a severe myopia will result that will further cause terrible pathological changes such as a peel-off of the Retina to myopia patents. At present, we understand that the problem of light and medium levels of myopia is not very serious, and myopic persons can see things clearly with a vision correction, but there may be a serious problem to a critical level of myopia and those people have to bear a terribly high risk of the eye health. With further understanding to the problem, the causes of myopia must be controlled and improved, or else a terrible consequence will result. Besides pathological changes and other causes, a person's abnormal habit of using eyes is an important factor that demands much more attentions. Some of these habitual behaviors will be passed on to the next generation, and the next generation will have similar bad habits causing myopia more easily.

Traditional vision correction methods for myopia aim at the problem of focusing an image in front of a Retina and use a single diverging lens (which is a concave lens in the air) to correct the abnormal focusing. These vision correction methods surely can recover the normal vision of a myopic person, but it cannot change the person's habit by changing one's visual environment, and thus the person keeps the old habit of using eyes, and thus most of the myopic persons maintain their myopia or even gain an increase of the level of myopia. A multi-focal lens for a vision correction can retard the habit, but a lens of the same nature cannot balance a myopia person's old habit. It is because the traditional single lens correction methods compress one's visual environment. We can see the proof in latter description of this specification. Therefore, a traditional single multi-focal lens used for progressively reducing the absolute value of the optical power only reduces the level of compression, and it still compresses the visual distance. In the real world, it is very rare for myopic persons to recover their normal vision, since the traditional vision correction methods cannot remove their bad habits. There are many vision training machines or methods available in the market, but the difficulties of these machines and methods reside on that human vision is an important tool for obtaining information, and once the vision of a person is blurred, trainings in a limited short time can provide a very little effect on the vision correction, and it is thus a major cause for the critical-level myopia, and such problem cannot be improved completely in an easy manner. We need some special methods to effectively train involuntary muscles in a Ciliary Body. We definitely need to have a good vision correction method for people who have vision problems to see things clearly as well as an apparatus for changing a person's bad habit, and thus improvements and feasible solutions to this problem are needed.

SUMMARY OF THE INVENTION

In view of the shortcomings of the prior art, the inventor of the invention based on years of experience in the vision related field to conduct extensive researches and experiments, and finally invented a multi-lens vision correction method and its apparatus in accordance with the present invention.

Therefore, it is a primary objective of the present invention to provide a multi-lens vision correction and its apparatus that use at least two lenses to form a basic architecture of a lens module, and a lens is closer to an eye, and the distance from the eye is as close as possible, such that the focusing for the vision correction allows a myopic person to see an object at a far distance clearly, and has an excessive compensation of minus optical power for the vision correction.

The lens at a distance farther from the eye is a convex lens having opposite characteristics with the lens at a distance closer to the eye according to the excessive compensation, and the invention uses and selects a lens combination with an appropriate optical power to produce a final image at a position closer to the front along the central optic axis, and the virtual image of an object converted by the lens module is designed, controlled and converted at a farther distance, so that a short distance is extended to a long distance, and the Ciliary Body and Lens of a person's eyes are moved for focusing and maintaining the final image at the Retina and thus the person can see objects clearly in a desired range. Unlike the movements made by a naked eye to observe the same object, the myopic persons' habit of using eyes is changed by a non-surgical method. Through the training that takes the regular learning, working and living conditions into consideration, a person's way of focusing an image can be corrected, and thus the present invention can recover the normal vision.

The secondary objective of the invention is to provide a multi-lens myopia correction apparatus that makes the Ciliary Body and Lens of a person's eye to be operated at a zone equivalent to the situation of seeing an object a farther distance without emphasizing on any particular object. The distance of an object can be extended from a near distance to a farther vision distance depending on the environment of a myopic person, so as to improve the vision of the myopic person and balance the movement of the involuntary muscles of the eyeballs. In other words, usually we cannot change the fact that we need to stay in a narrower environment causing a bad habit that leads to myopia. The invention changes the perceived environment to a larger, longer and wider perceived environment. With the application of the present invention, the perceived space can become larger than the real space. An eye will therefore accommodate differently by Ciliary Muscles in such a larger, longer and wider perceived environment while maintaining clear eyesight. The previous bad habit of a myopic person can be corrected by a new habit of guiding and controlling the person's Ciliary Muscles to relax as much as possible when even looking at an object at a near distance, and such arrangement can solve the problem of deteriorating myopia and can retard or even stop an increase of the axial length which will cause pathological changes to a critical myopic person. For pseudomyopia caused by bad habits of using eyes, the present invention can convert the distance and size of an object to improve of a person's habit of using eyes, and thus the myopia can be eliminated completely after the method and apparatus of the present invention have been applied for some time.

BRIEF DESCRIPTION OF THE DRAWINGS

The present invention will now be described in more detail hereinafter with reference to the accompanying drawings that show various embodiments of the invention, in which.

Attachments: Tables 1 to 7 list the calculated data of the present invention.

DESCRIPTION OF MAJOR COMPONENTS ILLUSTRATED IN THE FIGURES (1) Equivalent lens of an eye.
(2) Object
(3) Retina

DETAILED DESCRIPTION OF THE PREFERRED EMBODIMENTS

Other features and advantages of the present invention will become apparent in the following detailed description of the preferred embodiments with reference to the accompanying drawings.

Figure 1:
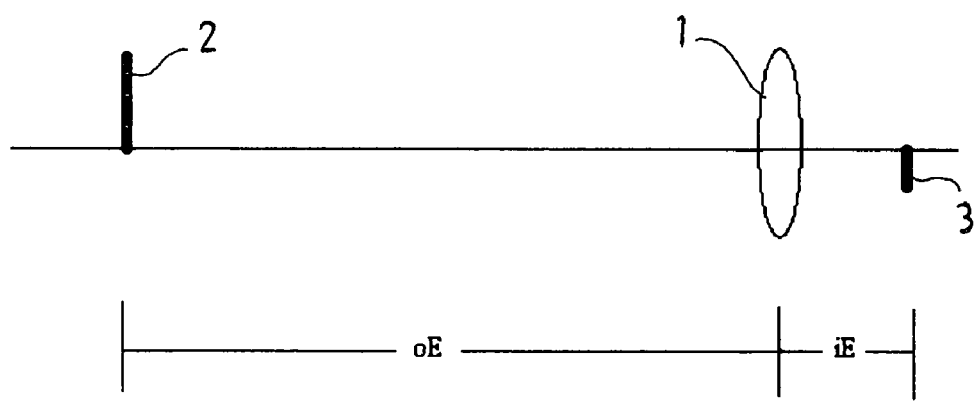
FIG. 1 is a schematic side view of a final image of an object viewed by naked eyes.

The principle of the invention is illustrated by geometrical optics. Referring to FIG. 1, a module having no lens represents an equivalent lens (1) of a normal naked eye's vision, wherein the symbols used for the operations are defined below:

Deye: It is defined as the total optical power of a normal naked eye, and the Deye of a normal naked eye varies with the positions oE or oA of an object (2) only. The unit of all the optical power of the symbols and variables described below is in Diopter.

Dcor: It is defined as the equivalent optical power of a Cornea of an eye, and the Dcor of a normal naked eye is constant.

Daqe: It is defined as the equivalent optical power of an Aqueous Humor, and the Daqe of a normal naked eye is constant.

Dlns: It is defined as the equivalent optical power of a Lens, and the Dlns normally varies with the positions oE or oA of an object (2) including any other temporary changes of an eyeball according to oA, such as a slight change of the equivalent optical power caused by the most recently occurred change of the axial length.

Dvit: It is defined as the equivalent optical power of a Vitreous Body and other undefined portion, which will not vary with the position oA of an object (2), and the Dvit of a normal naked eye is constant.

fE: It is defined as the focal length of an equivalent lens of an eye, and the fE should vary with the positions oE or oA of an object (2).

minDeye: It is defined as the minimum Deye of a final image for a normal eye, which equals to the reciprocal of iE.

oE: It is defined as the optic axis position of an object (2), and its reference point is an optic center of an equivalent lens (1) of an eye, and oE equals to oA which is an uncontrollable variable.

iE: It is defined as the position of a final image situated at an optic axis and produced by an eye (it is situated at the Retina (3) when the focusing is normal), and its reference point is an optic center of an equivalent lens (1) of an eye, and iE varies with the Deye, but the iE of a normal naked eye is constant and equals to the reciprocal of the minDeye.

HoE: It is defined as the actual height of an object (2), which equals to HoA and is an uncontrollable variable.

HiE: It is defined as the height of a final image of an object (2) viewed by an eye, and HiE varies with Deye, oE or oA and HoE.

rHiE: It is defined as the ratio of HiE to HoE.

The total optical power of Deye for a normal naked eye is given below:

$$Deye = Dcor + Daqe + Dlns + Dvit \quad (1)$$

$$fE = 1/Deye \quad (2)$$

In a normal naked eye's vision, the Deye varies with the position oA of an object (2);

$$Deye = 1/iE + 1/oE = 1/iE + 1/oA \quad (3)$$

Find the change percentage of Deye with respect to oA, and Dlns varies with oA;

$$d(Deye)/d(oA) = d(Dcor + Daqe + Dlns + Dvit)/d(oA) = d(Dlns)/d(oA) \quad (4)$$

$$d(Deye)/d(oA) = d(Dlns)/d(oA) = -1/(oA^2) \quad (5)$$

The height of a final image at the eye is given as follows:

$$HiE = (0 - iE/oE) \ast HoE = (0 - iE/oA) \ast HoA \quad (6)$$

$$HiE = (0 - 1/(1/fE - 1/oA)/oA) \ast HoA = (fE/(fE - oA)) \ast HoA \quad (7)$$

The ratio of the height of the final image to the height of the original object (2) is:

$$rHiE = HiE/HoE = 0 - iE/oA = fE/(fE - oE) = fE/(fE - oA) \quad (8)$$

Unless the eyeball is deformed, the position of the Retina will not vary anytime when viewing an object. For simplicity of calculation, fE is assumed to be constant, and the position iE of the final image of an object (2) at the position oA is given below:

$$iE = 1/(1/fE - 1/oA) \quad (9)$$

$$iE = 1/(Deye - 1/oA) \quad (10)$$

Figure 2:
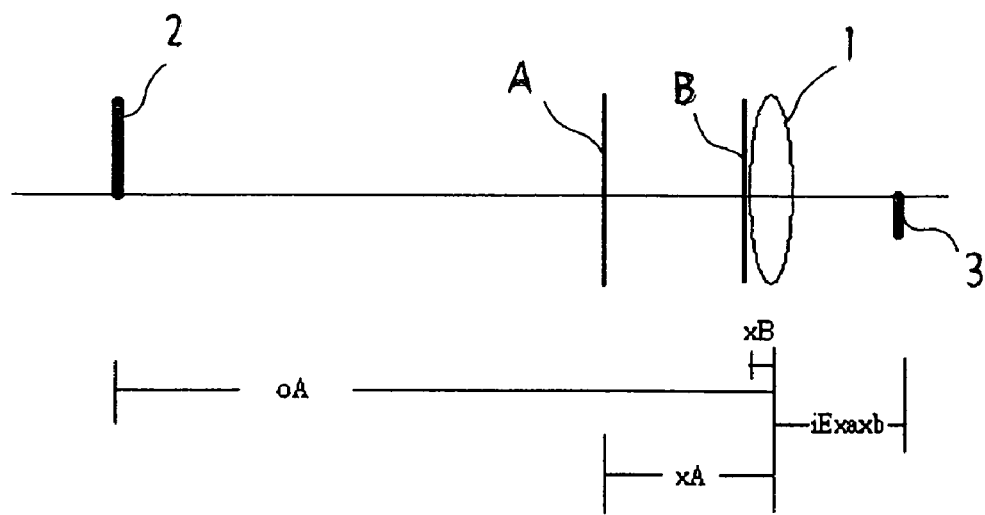
FIG. 2 is a schematic side view of a final image of an object according to the invention.

In FIG. 2, the use and operation of symbols for adding the lens combination and equivalent lens module (1) of the eye according to the present invention are defined as follows:

Deye_c: If the lenses A and B are used as the lens module for the present invention, the equivalent optical power of the Lens of eyes and the total optical power DB (unit in Diopter) of the lens B will vary with the distance oA, DA, DB, xA, xB and Ddis of an object.

Dlns_c: If the lenses A and B are used as the lens module for the present invention, the equivalent optical power of the Lens of eyes will vary with the positions oE or oA of an object (2), but if the curve of change is different from the original naked eye's vision, then the equivalent optical power of the Lens of eyes will vary with DA, DB, xA, xB and Ddis.

Deye_s: If the lenses A and B are used as the lens module for the present invention, different habits of using eyes will be established. In other words, the equivalent optical power of the eye Lens will react differently. Dlns_c will replace Dlns originally in the optical power of a normal eyeball, and thus we can observe that the optical power of an eyeball at the same position from an object may have different effects in changing its optical power, so as to facilitate our evaluation on whether or not these lens modules can meet the required distance and size of the converted object. This is for evaluation purpose only. Deye_s is equal to Deye_c minus excessive compensation optical power DBe of the lens B, and it varies with the change of oA, DA and xA.

Ddis: It is defined as the total equivalent optical power of an eye deformation and pseudomyopia, which is the equivalent optical power of hyperopia or myopia. The total equivalent optical power does not vary with the change of oA, which is an uncontrollable variable. For a normal naked eye, the Ddis equals to zero, and the Ddis may be resulted from the Ciliary Body being unable to release the tension leading to pseudomyopia, or the axial length being elongated to blurs the final image, or both. Even though the conditions of the actual change are different, the vision correction needs to compensate the lens to balance the corresponding optical power Ddis in order to focus the final image of an object onto the Retina normally. For myopia caused by a change of the axial length, we can assume that the axial length is normal, and a different distorted portion of the optical power is considered as the Ddis of additional abnormal optical power of Lens.

fEx: It is defined as the focal length of the equivalent lens (1) of an eye, when the present invention is used. fEx varies with oA, DA, xA, and Ddis, and its reciprocal is Deye_x.

fEc: It is defined as the equivalent focal length of the equivalent lens (1) of an eye and the lens module comprised of lens B, when the present invention is used, and fEc varies with oA, DA, DB, xA, xB and Ddis.

xA: It is defined as the distance between the optic center of lens A and the equivalent lens (1) of an eye, which is a controllable variable.

xB: It is defined as the distance between the optic center of lens B and the equivalent lens (1) of an eye, which is controllable variable.

xBs: It is defined as the distance between the lens B and the surface of an eye, which facilitates making the measurement.

oA: It is defined as the position of an object at an optic axis, and its reference point is the optic center of the equivalent lens (1) of eyes, and oA is equal to oE, which is an uncontrollable variable.

iA: It is defined as the final image of an object (2) produced by a lens A at the position of an optic axis, and its reference point is an optic center of the lens A, which varies with oA and DA.

oB: It is defined as the object of lens B (which is the final image of lens A) at the position on an optic axis position, and its reference point is the optic center of an equivalent lens (1) of eyes.

iB: It is defined as the final image produced by lens B at a position on the optic axis, and its reference point is the optic center of lens A, which varies with oB and DB.

iExaxb: It is defined as the position of the final image at the optical axis produced by eyes (which is at the Retina (3) for normal focusing) when the present invention uses lens A and lens B as the lens module and xB<>0 and not approaching zero, and its reference point is the optic center of the equivalent lens (1) of eyes. If the eye Lens can be adjusted fully, then iExaxb is a constant.

iExa: It is defined as the position of the final image at the optical axis produced by eyes (which is at the Retina (3) for normal focusing) when the present invention uses lens A and lens B as the lens module and xB=0 or approaches zero, and its reference point is the optic center of the equivalent lens (1) of eyes. If the eye Lens can be adjusted fully, then iExa is a constant.

oExaxb: It is defined as the object of eyes (which is the final image of lens B) at the position of an optical axis when the present invention uses lens A and lens B as the lens module, and xB<>0 and not approaching zero, and the reference point of eyes is the optic center of the equivalent lens (1) of eyes.

fA: It is defined as the focal length of lens A, which is a controllable variable.

fB: It is defined as the focal length of lens B, which is a controllable variable.

DA: It is defined as the optical power of lens A, which is a controllable variable.

DB: It is defined as the optical power of lens B, which is a controllable variable.

DBe: It is defined as the excessive compensation for lens B to compensate the eyes to a normal optical power, which is a controllable variable.

HoA: It is defined as the height of an object (2) for the final image of lens A final image, which equals to HoE and is an uncontrollable variable.

HiA: It is defined as the height of the final image of lens A passing through an object, which varies with DA, HoA, xA and oA.

HoB: It is defined as the height of an object (2) for producing the final image of lens B, which is HiA here.

HiB: It is defined as the height of the final image passing through lens B, which varies with DB, HoB, xB and oB.

HiEax: It is defined as the height of the final image of an object (2) when the present invention is used, and HiEax varies with Deye_x and HiB.

rHiEax: It is defined as the ratio of the height HiExa of the final image of an object (2) to the actual height HoA of the object (2) when the present invention is used.

The variables or constants specially mentioned in the specification are provided for reference only and not intended to be the only variables or constants that affect the related function. Please refer to the related formulas for details.

In FIG. 2, related formulas of the present invention are derived as follows:

A final image is produced at iA when the light of an object (2) at oA passes through the lens A, and the height of the final image is HiA.

$$iA=1/(1/fA-1/(oA-xA)) \quad (11)$$

$$HiA=(0-iA/(oA-xA))*HoA \quad (12)$$

The coordinates of iA are converted into oB.

A final image is produced at iB when the light of an object (2) at oB passes through the lens B, and the height of the final image is HiB.

$$oB=xA-iA \quad (13)$$

$$iB=1/(1/fB-1/(oB-xB)) \quad (14)$$

$$HiB=(0-iB/(oB-xB))*HiA \quad (15)$$

The coordinates of iB are converted into oExaxb.

A final image is produced at iExaxb when the light of an object (2) at oExaxb passing through the eyes, and the height of the final image is HiExaxb.

$$oExaxb=xB-iB \quad (16)$$

$$iExaxb=1/(1/fEx-1/oExaxb) \quad (17)$$

$$HiExaxb=(0-iExaxb/(oExaxb))*HiB \quad (18)$$

The design requires xB to approach to zero, so that xA>>xB, and DA is obviously different from DB of xB, since xA affects its characteristics. Therefore, iExaxb is simplified to iExa.

$$iExa=limxB-->0(iExaxb)=1/(1/fEx+1/fB-1/oB) \quad (19)$$

Now, the change of fEx is affected by oA, DA and xA. If Ddis exists, it will be affected as well. The original normal naked eye will not just follow Deye reflected by oA.

$$Deye\_c=1/fEx+1/fB=Deye\_x+DB \quad (20)$$

$$fEc=1/Deye\_c \quad (21)$$

$$iExa=1/(1/fEc-1/oB) \quad (22)$$

From Formulas (11) to (22), the function iExa of the variables xA, oA, fA and fEc can be found as follows:

$$iExa=fEc*(xA^2-oA*xA+fA*oA)/(xA^2-(oA+fEc)*xA-fEc*fA+(fA+fEc)*oA) \quad (23)$$

After the lens B that approaches to zero compensates DB, the Ddis of myopia is offset to zero, and the eyes recover the expected normal value of Deye. After the Ddis is offset, the remaining DB is the excessive compensation value of DBe. After Deye_c is found, the change percentage of Deye_c with respect to oA is found, and the optical power of Lens of eyes is represented by Dlns_c, wherein only Dlns_c varies with oA.

$$Deye\_c=Dcor+Daqe+Dlns\_c+Dvit+Ddis+\\DB=Dcor+Daqe+Dlns\_c+Dvit+DBe \quad (24)$$

From Formulas (23), we obtain:

$$fEc=iExa*(xA^2-oA*xA+fA*oA)/(xA^2+(iExa-oA)*xA+iExa*fA+(fA-iExa)*oA) \quad (25)$$

From Formulas (1) and (24), we obtain:

$$Deye\_s = Deye - Dlns + Dlns\_c = Deye\_c - (Ddis + DB) = Deye\_c - DBe \quad (26)$$

$$d(Deye\_c)/d(oA) = d(Dcor + Daqe + Dlns\_c + Dvit + Ddis + DB)/d(oA) = d(Dlns\_c)/d(oA) \quad (27)$$

Deye_c is obtained from Formula (25) and its derivative is given as follows:

$$d(Deye\_c)/d(oA) = d(Deye\_s)/d(oA) = -fA^2/(xA^2 - oA^* xA + oA^*fA)^2 \quad (28)$$

From Formulas (11) to (23), the variables xA, oA, fA and fEc of Function (rHiExa) are obtained as follows:

$$HiExa = \lim_{xB \to 0}(HiExaxb) \quad (29)$$

$$rHiExa = HiExa/HoA = -fA^*fEc/(xA^2 - (oA + fEc)^* xA - fEc^*fA + (fA + fEc)^*oA) \quad (30)$$

Substitute the variable fEc by iExa in Formulas (25) and (30), $$rHiExa = -iExa^*fA(xA^2 - oA^*xA + fA^*oA) \quad (31)$$

With the present invention, our eyes obtain the feeling of a distance and a size for an object different from our naked eye's vision, and the Ciliary Body of our eyes tries to adjust the optical power of Lens to obtain the clear final image of an object that still falls on the Retina. By the new behavior, we can figure out that the actual distance and height of the object (2) correspond to the feeling of the equivalent distance and height, wherein the symbols are defined as follows:

soA: It is defined as the naked eye's vision equivalent position of an object, which is actually disposed at oA.

sHoA: It is defined as the vision equivalent height in the converted visual environment of an object, which has an actual height of HoA and is actually disposed at oA.

rsHiExa: It is defined as the ratio of the height HiExa of the final image of an object to the eye-feeling height sHoA, when the present invention is adopted.

In other words, the device disclosed in the present invention is used to view an image, and Deye_c produces an image by using DA of the distance xA, and the curve of Deye_s(=Deye_c-DBe) is different from the curve of Deye, and Dlns_c represents the movement status for controlling the Lens by the Ciliary Body according to the present invention. If the Dlns in Deye is substituted by Dlns_c, for evaluation we can reversely derive the corresponding normal object distance (Ddis=0 D) and height. It is noted that soA is an illustration of the equivalent position of the object and does not imply the degree of the extent or compression of the visual environment that affects the tendency of optical power change of Lens. The tendency of the visual environment changes the tendency of the habit of eyes.

From Formulas (10), (24)) and (26):

$$soA = 1/(Deye - Dlns + Dlns\_c - 1/iE) = 1/(Deye\_c - DBe - 1/iE) = 1/(Deye\_s - 1/iE) \quad (32)$$

Although the normal ratio of the final image sensed by the eyes is rHiExa/rHiE, we still can take the situations of moving our eyes to see an object at a far distance or a near distance into consideration, and thus the eye-feeling position and the eye-feeling size of an object are computed. From Formulas (6), (8) and (31), we obtain:

$$rsHiExa = HiExa/sHoA = -iE/soA \quad (33)$$

$$sHoA = -soA^*HiExa/iE = soA^*HiExa/(-oA^*HiE/HoA) \quad (34)$$

$$rsHoA = sHoA/HoA = -(soA/oA)^*(rHiExa/rHiE) \quad (35)$$

vT: It is defined as the sum of n periods of time, and there are n periods of time for our eyes to observe an object at a different distance within a certain evaluation period.

vTi: It is defined as the $i^{th}$ period of time for our eyes to observe an object.

soAi: It is defined as the vision equivalent position at the $i^{th}$ period of time for our eyes to consciously gaze or observe at an object (2). In other words, it is a vision distance between an object (2) and eyes.

asoA: It is defined as the average vision distance of an object (2) observed by eyes in a certain evaluation period.

$$vT = vT1 + vT2 + vT3 + \ldots + \ldots Ti + \ldots + vTn \quad (36)$$

$$asoA = (vT1^*soA1 + vT2^*soA2 + vT3^*soA3 + \ldots + \ldots vTi^* soAi + \ldots + vTn^*soAn)/vT \quad (37)$$

As mentioned above, the change of positions of an object through a vision indirectly changes the habit of moving the eyes, and the way of changing the distance will be described in detail below. In the following computation, it is assumed that the eyes of a person are normal, and the minimum optical power of the eyes is 54 D (Diopter). Please refer to Table 1 for the settings of the lens module, wherein the foregoing formulas are used for the computation and the results are listed in Table 2.

Field #1 in Table 2 shows the distance oA or oE between an eye and an object. We can see that if xA=0, Formula (28) is equal to Formula (5) and xA definitely affects the graph of "Lens optical power change/object distance change versus object distance".

For the lens combination A: In Table 1, data are substituted into Formula (28) to compute the change percentage of "Lens optical power change/object distance change versus object distance" and the result is shown in Field #5 of Table 2. For the lens combination B: In Table 1, data are substituted into Formula (28) to compute the change percentage of "Lens optical power change/object distance change versus object distance", and the result is shown in Field #6 of Table 2.

For the lens combination C: In Table 1, data are substituted into Formula (28) to compute the change percentage of "Lens optical power change/object distance change versus object distance" and the result is shown in Field #7 of Table 2.

Figure 3:
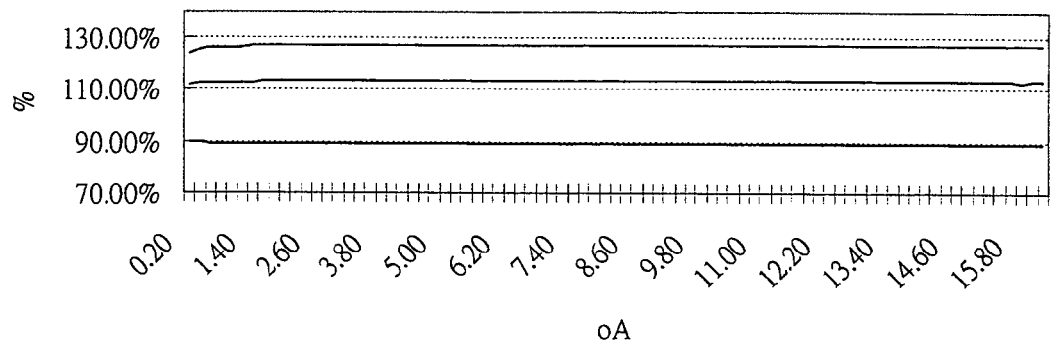
FIG. 3 is a graph of a Lens optical power (unit in Diopter) change/an object distance (unit in meter) change versus an object distance (unit in meter) of the lens combinations A, B and C of Table 1 according to the invention (data are obtained from fields #2, #3, #4 (for vertical axis) and #1 (for horizontal axis) of Table 2)

Referring to FIG. 3, the y-axis shows the ratio d(Dlns_c)/d(oA)=d(Deye_c)/d(oA) of the change percentage of "Lens optical power change/object distance change versus object distance" for the lens combinations A, B and C, and the unit is %, where the computing data come from Fields #2, #3 and #4 in Table 2; and the x-axis shows the object distance oA (with a unit in meter), and the computing data come from Field #1 of Table 2. The data will be compared as follows:

In Field #2 of Table 2, the result of Field #6 of Table 2 is compared with the result of Field #5 of Table 2, and we can find out from the graph that the change percentage of "Lens optical power change/object distance change versus object distance" provided by the lens combination B is equal to 113% of the same graph for the lens combination A at a slightly farther distance, and the values in Fields #5, #6 and #7 are negative, indicating that when the object distance is moved to a farther place or the vision is moved to a farther place, the extent of the tendency for the optical power of the Lens becoming a minus increased number that represents a smaller value. is equivalent to the extent of the tendency for the eyes viewing at a farther place, and thus the lens combination B can convert each unit of the distance and control the movement of the Ciliary Body to control the Lens and adjust the change of the Lens, so as to change its optical power to approximately 113% of the normal value. It shows that this lens combination can extend the vision distance, because Lens of a normal naked eye will react more to get lower optical power for longer distance. It is noted that using this type of combination, an eye will still try to react more to get less optical power of its Lens than a normal naked eye does for an approaching infinite distant object. Ciliary Muscles will also try to relax more accordingly to try to get less optical power of Lens. The present invention definitely helps relaxing the Ciliary Muscles better.

In Field #3 of Table 2, the result of Field #7 of Table 2 is compared with the result of Field #5 of Table 2, we can find out from the graph that the change percentage of "Lens optical power change/object distance change versus object distance" provided by the lens combination C is approximately equal to 89% of the same graph for the lens combination A at a farther distance. In other words, the lens combination C can change each unit of the distance for controlling the movement of the Ciliary Body to control the Lens and can adjust the change of the Lens, so as to change its optical power to approximately 89% of the normal value. It shows that this lens combination can shorten the vision distance, because Lens of a normal naked eye will react less for shorter distance. It is noted that using this type of combination, an eye will try to react less to maintain more optical power of its Lens than a normal naked eye does even for approaching infinite distant object, because the distant object will be sensed closer, even possibly much closer, than where it should be. Even the original approaching infinite distance is also compressed. Ciliary Muscles will try to contract more accordingly, because more optical power of Lens is required to focus the image. One example of combination C is the single minus lens that is not close enough to the eyeball, especially lens with a traditional frame holding it. It demonstrates that the traditional vision correction keeps the Ciliary Muscles exercising less than a naked eye should do. It keeps people seeing objects like in a smaller space that is not our innumerable generations of ancestors used to live in for a long time.

In Field #4 of Table 2, the result of Field #6 of Table 2 is compared with the result of Field #7 of Table 2, and we can find out from the graph that the change percentage of "Lens optical power change/object distance change versus object distance" provided by the lens combination B is approximated equal to 127% of the same graph of the lens combination C at a farther distance. In other words, the lens combination B can convert to a situation equivalent to the ratio of optical power of eye Lens to approximately 127%. It shows that the difference of these two lens combinations.

In this computation, the lenses with opposite converging and diverging properties are used for a near lens B and a far lens A of the basic lens combination of the present invention, and the effect of xA is added to provide a major difference for the graph. The present invention can use such lens combinations appropriately to obtain a useful graph to help users adjust their habits by changing their visual environment.

In the lens combination A, the lenses A and B are placed together, and thus xA=0 cm, and xB=0 cm. Now, the properties of DA and DB are opposite and their magnitudes are equal, and thus they will offset each other.

In the lens combination B, the lenses A and B are placed at positions with a distance of 2.0 cm apart, and thus xA=2.0 cm and xB=0 cm. Now, DA=3.0 D and DB=−3.0 D, and the lenses A and B will not offset each other completely. Since the absolute value of the slope is larger than the normal value, therefore the normal vision obtained by this correction method will produce the effect of extending the vision distance to simulate a larger, longer and wider space. Since DB+Ddis=DBe, therefore DBe=DB=−3.0 D with the assumption of Ddis=0 in this example.

The lens combination C places the lenses A and B at positions with a distance of 2.0 cm apart, and thus xA=2.0 cm, xB=0 cm. Now, the lenses A and B having DA=−3.0 D and DB=3.0 D will not offset each other, since the ratio of the absolute values of the slopes is smaller than the normal value. The normal vision obtained by this correction method will produce the effect of compressing the vision distance to simulate a narrower space. DB+Ddis=DBe, and DBe=DB=3.0 D provided that Ddis=0. The equivalent effect of this combination is to let DB=0 and Ddis=3 D while placing lens A with DA=−3 D at 2.0 cm away from the myopic eyeball.

Because the resolution of the Retina is fixed, the change of object size (measured by the height of the object) will directly change the level of recognition of a vision and the magnification will play an important role in the lens combination. Since the present invention can change the vision distance of an object, the invention is capable of changing the size of the real image produced on the Retina to directly control the level of recognition. If the level of recognition is sufficient, then the eyes need not to be too close to the object to obtain related information. On the other hand, if the level of recognition is insufficient, then the eyes have to be closer to the object to obtain related information.

Referring to the set values of a lens combination as listed in Table 1, some formulas will be used for the computation and the results are listed in Table 3.

Field #1 of Table 3 is the distance oA between an eye and an object and we can observe that if xA=0, Formula (31) is equal to Formula (8).

For the lens combination A: In Table 1, data are substituted into Formula (31) to compute the percentage of "final image height/object height versus object distance" (when the object position is oA), the result is shown in Field #5 of Table 3.

For the lens combination B: In Table 1, data are substituted into in Formula (31) to compute the percentage of "final image height/object height versus object distance" (when the object position is oA), and the result is shown in Field #6 of Table 3.

For the lens combination C: In Table 1, data are substituted into Formula (31) to compute the percentage of "final image height/object height versus object distance" (when the object position is oA), and the result is shown in Field #7 of Table 3.

Figure 4:
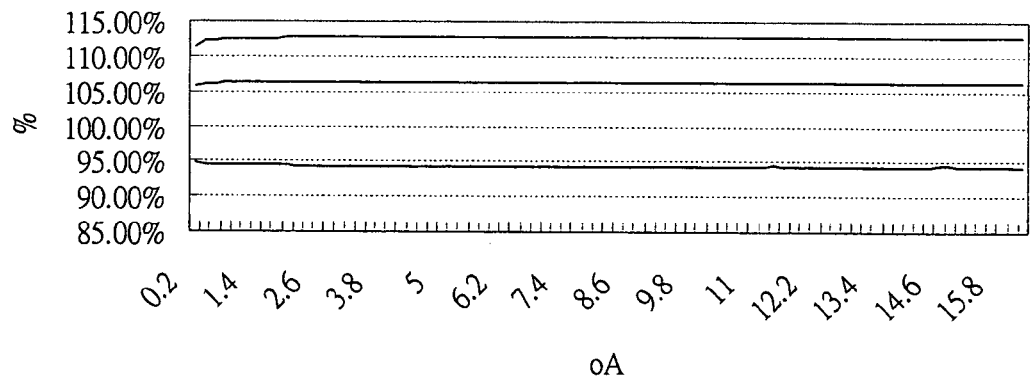
FIG. 4 is a graph of the ratio of a final image height/an object height (unit in %) versus an object distance (unit in meter) of the lens combinations A, B and C of Table 1 according to the invention (data are obtained from fields #2, #3, #4 (for vertical axis) and #1 (for horizontal axis) of Table 3)

Referring to FIG. 4, the y-axis shows the ratio HiExa/HoA of the percentage of "final image height/object height versus object distance" for the lens combinations A, B and C, and the unit is %, where the computing data come from Fields #2, #3 and #4 in Table 3; and the x-axis shows the object distance oA (with a unit in meter), and the computing data come from Field #1 of Table 3. The data will be compared as follows:

In Field #2 of Table 3, the result in Field #6 of Table 3 is compared with the result in Field #5 of Table 3, and we can find out from the graph that the change percentage of "final image height/object height versus object distance" of the lens combination B is approximately 106% of the change percentage of "final image height/object height versus object distance" of the lens combination A at a farther distance. In other words, the lens combination B can change the height of the final image for each unit of the object to approximately 106% of the height of the final image height, wherein the negative values in Fields #5, #6 #7 stand for an inverted real image, showing that this combination can enlarge the size of the final image of that in a naked eye.

In Field #3 of Table 3, the result of Field #7 of Table 3 is compared with the result in Field #5 of Table 3, we can find that the change percentage of "final image height/object height versus object distance" of the lens combination C is approximately 94% of the change percentage of "final image height/object height versus object distance" of lens combination A at a farther distance. In other words, the lens combination C can change the height of the original final image for each unit of the object to approximately 94% of the height of the final image, showing that this combination can reduce the size of the final image of that in a naked eye.

In Field #4 of Table 3, the result of Field #6 of Table 3 is compared with the result of Field #7 of Table 3, we can find out that the change percentage of "final image height/object height versus object distance" of the lens combination B is approximately 112% of the change percentage of "final image height/object height versus object distance" of the lens combination C. It shows that the basic lens combination used in the present invention surely provides a different height of the final image of the object.

The magnification mentioned above is only a result of an enlarged or reduced final image of an object at the same distance oA from the eyes. As to the actual feeling of the vision, we also can consider the conditions of our eyes viewing at a far object or a near object. If the distance of an object is farther from the eyes, the produced image should be smaller, and vice versa. For example, a car at a distance of 100 meters and the same car at a distance of 10 meters apparently have different sizes visually. If they look the same, then the car at 100 meters is enlarged 10 times. On the other hand, the car is reduced visually. Thus, the size of an object as to the feeling of vision can be obtained by Formulas (8), (32) and (35).

If a reflected light of an object has not been processed by any device or system, then the Ciliary Body will control the Lens to adjust the distance to the actual distance it is used to control. The present invention definitely can provide a more sensitive distance conversion of the vision for the Ciliary Body without affecting normal learning, working or living conditions, so that the Ciliary Body can use a new habit to adjust the muscle movements, improve vision, and stop deterioration.

After a vision problem occurs, we cannot see things clear if there is no tool available to help us. Psychologically, we feel insecure, and the actual life does not allow anyone to live without any visual information, and thus a vision correction is needed for the vision problem. If a myopic person often enlarges a book at a distance of 10 meters away from the myopic person to read the book, then the myopic person no longer needs to change the old habit intentionally but conveniently establish a new habit of seeing things. As time passes by, the new habit reduces the level of our original pseudomyopia. For pseudomyopia at an early stage, a proper vision correction method may be able to recover the person's normal naked eye's vision.

The numeric values selected for the lenses A, B are very important, and a correct design can give consideration to both vision correction and habit correction. We can correctly cope with the actual environment to use the present invention to achieve the effect of changing our habit. The present invention is able to create an expanded visual environment for users to observe objects the way more similar to our ancestors did living in an open space. To facilitate evaluating whether or not a user can look at a far distance for a long time, we can use asoA as shown in Formula (37) to confirm the effect of "looking an object at a far distance of a larger, longer and wider space". From related formulas and experiments, we know that asoA is greater than 4 meters (as in a significant valid area). The larger the asoA, the better is the effect.

Another feature of the present invention resides on that the invention is not limited by a person's level of myopia (Ddis) for the design of the required environmental change. If only the lens A is taken into consideration, then we cannot create the expected result for the environment or the person cannot see the object clearly at all. Therefore, we also need to consider the selection of lens B to control the change of the environmental qualitatively and quantitively and help the patients to see things clearly. By the reverse training, the old habit can be replaced. Basically, the variables DA and xA of the present invention can control the distance conversion rate, and DA copes with DBe to control the terminal point or vision range of an extended distance. As to the detail effect of each variable, refer to the related formulas for computing the actual results of the effect. Since the present invention has the qualitative and quantitative control, therefore the follow-up tracking and evaluation are feasible.

A contact lens is used as a near lens for the illustration of the vision correction method as follows, and the distance xB between the near lens B and the eyeball approaches to zero. Assumed that a myopic person needs a vision correction of −3D to clearly see an object at a far distance and the myopic person often sees objects in a range less than 70 cm, the myopic person now feels the object at a farther distance as if it is at a near distance. Refer to the set values of the lens combinations as listed in Table 1, the computed results are shown in Tables 4 and 5.

Field #1 of Table 4 shows the distance oA between an eye and an object and Field #1 of Table 5 shows the distance oA between an eye and an object, and the only difference is that the range of distance is different from Field #1 of Table 4.

For the lens combination A: Referring to Table 1, data are substituted into Formulas (21), (25) and (26) to compute the equivalent eye optical power (Deye_s=Deye_c-DBe) and the result is shown in Field #4 of Table 4.

For the lens combination A: Referring to Table 1, data are substituted in Formulas (21), (25) and (26) to compute the equivalent eye optical power Deye_s, and the result is shown in Field #4 of Table 5.

For the lens combination D: Referring to Table 1, data are substituted Formulas (21), (25) and (26) to compute the equivalent eye optical power Deye_s, and the result is shown in Field #5 of Table 4.

To extend the near object to a farther position, the optic center from the eyeball xA is located at the same position, and the formula for a pair of bifocal glasses is added to form lens combination E with a second far lens A in order to obtain the following:

For the lens combination E: Referring to Table 1, data are substituted into Formulas (21), (25) and (26) to compute the equivalent eye optical power Deye_s, and the result is shown in Field #5 of Table 5.

The vision distance can use Dlns_c to replace Dlns of Deye as derived from Formula (32).

Figure 5:
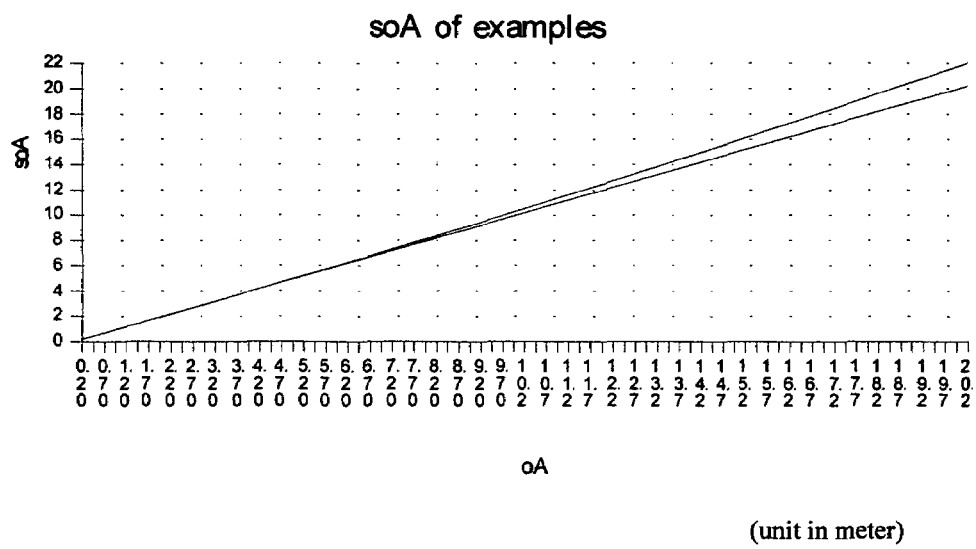
FIG. 5 is a graph of the converted vision distance soA (unit in meter) versus object distance oA (unit in meter) of the lens combinations A and D of Table 1 according to the invention (data are obtained from fields #2, #3 (for vertical axis) and #1 (for horizontal axis) of Table 4)

Referring to FIG. 5, the Y-axis shows the converted vision distance soA with a unit in meter for the lens combinations A and D, wherein the data come from the computed Fields #2 and #3 of Table 4. The x-axis shows the object distance oA with a unit in meter, wherein the data come from Field #1 of Table 4. The data will be compared as follows:

The object distance of the vision shown in Field #4 of Table 4 is derived reversely from the optical power of an eye, and the result is placed in Field #2 of Table 4, and the result is the same as Field #1 of Table 4 because the result is derived from Deye of the normal naked eye (Ddis=0 D).

The object distance of the vision shown in Field #5 of Table 4 is derived reversely from the optical power of an eye, and the result is placed in Field #3 of Table 4, and the result is almost the same, which indicates that the distance is extended slightly, but the level is rather insignificant, and its advantage resides on that the far object can be seen clearly, but its disadvantage resides on that the vision distance for a near object cannot be achieved easily.

Figure 6:
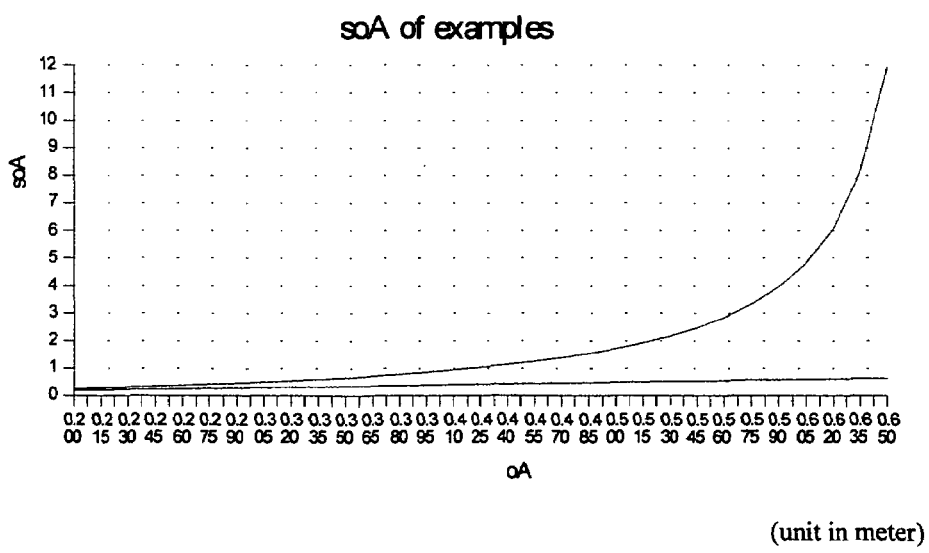
FIG. 6 is a curve of the converted vision distance soA (unit in meter) versus object distance oA (unit in meter) of the lens combinations A and E of Table 1 according to the invention (data are obtained from fields #2, #3 (for vertical axis) and #1 (for horizontal axis) of Table 5)

Referring to FIG. 6, the y-axis shows the converted vision distance soA with a unit in meter for the lens combinations A and E, wherein the data come from the computed Fields #2 and #3 of Table 5. The x-axis shows the object distance oA with a unit in meter, wherein the data come from Field #1 of Table 5. The data will be compared as follows:

The object distance of the vision shown in Field #4 of Table 5 is derived reversely from the optical power of an eye, and the result is placed in Field #2 of Table 5, which is equal to Field #1 of Table 5, because the result is derived from the normal Deye.

The object distance of the vision shown in Field #5 of Table 5 is derived reversely from the optical power of an eye, and the result is placed in Field #3 of Table 5. The data clearly shows an obvious extension for a near distance, and its advantage resides on that it is favorable for extending the vision distance at a near distance. It is noted that the visual environment is still expanded in combinations D (around 102% optical power change of a normal one) and E (around 109% optical power change of a normal one) no matter which part of the expanded space the user sees (evaluated by the soA), so that the chance to relax more of the Ciliary Muscles is always available in an expanded visual environment.

Analysis of the Height of a Final Image:

Field #1 of Table 6 shows the distance oA between an eye and an object, and Field #1 of Table 7 shows the distance oA between an eye and an object, and their only difference resides on that the range of distance is different from Field #1 of Table 6.

For the lens combination A: Referring to Table 1, data are substituted into Formula (31) to compute the percentage of "final image height/object height versus object distance" (at an object position oA), and the result is shown in Field #3 of Table 6.

For the lens combination A: Referring to Table 1, data are substituted into Formula (31) to compute the percentage of "final image height/object height versus object distance" (at an object position oA), and the result is shown in Field #3 of Table 7.

For the lens combination D: Referring to Table 1, data are substituted into Formula (31) to compute the percentage of "final image height/object height versus object distance" (at an object position oA), and the result is shown in Field #4 of Table 6.

For the lens combination E: Referring to Table 1, data are substituted into Formula (31) to compute the percentage of "final image height/object height versus object distance" (at an object position oA), and the result is shown in Field #4 of Table 7.

Figure 7:
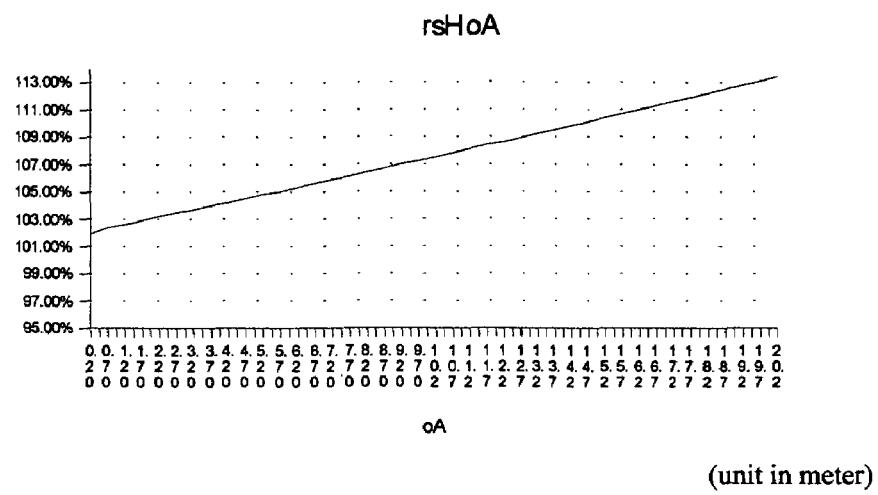
FIG. 7 is a curve of the ratio of converted vision height sHoA (unit in meter) versus object distance oA (unit in meter) of the lens combination D of Table 1 to the lens combination A of Table 1 according to the invention (data are obtained from fields #2 (for vertical axis) and #1 (for horizontal axis) of Table 6)

The vision distance can be computed by the size of image produced on the Retina by a naked eye's vision derived from Formulas (8), (32) and (35). Referring to FIG. 7, the y-axis shows rsHoA of the lens combination D with a unit in %, wherein the data come from the computed Field #2 of Table 6. The x-axis shows the object distance oA with a unit of meter, wherein the data come from Field #1 of Table 6. The data are compared as follows:

Field #4 Table 6 shows the size of an object at vision derived reversely from the formulas, and the result is placed at Field #2 of Table 6, and we can observe that the object is increased slightly.

Figure 8:
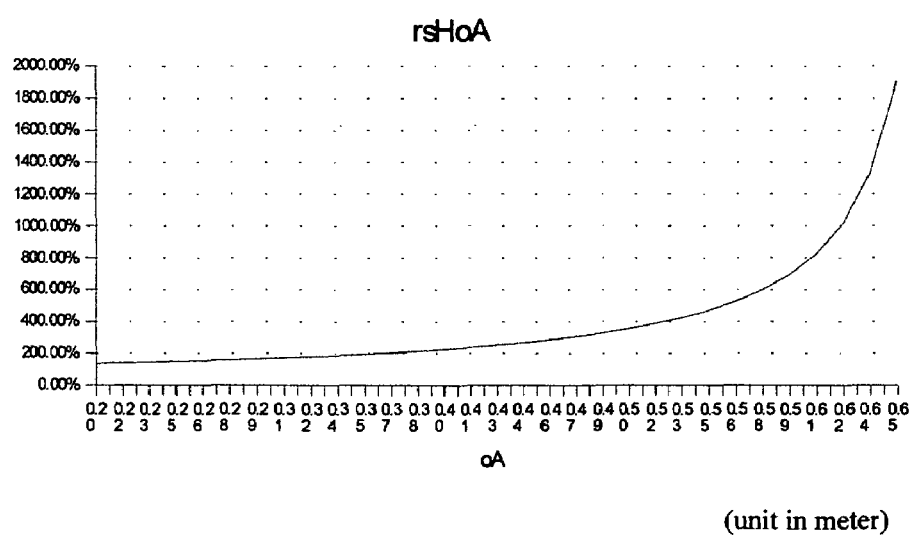
FIG. 8 is a graph of the ratio of converted vision height sHoA (unit in meter) versus object distance oA (unit in meter) of the lens combination E of Table 1 the lens combination A of Table 1 according to the invention (data are obtained from fields #2 (for vertical axis) and #1 (for horizontal axis) of Table 7).

Referring to FIG. 8, the y-axis shows rsHoA of the lens combination E in a unit of %, wherein the data come from the computed Field #2 of Table 7. The x-axis shows the object distance oA with a unit of meter, wherein the data come from Field #1 of Table 7. The data are compared as follows:

The object size of the vision as listed in Field #4 of Table 7 is derived reversely from the formulas, and the result is placed in Field #2 of Table 7, and we can observe that the size of the object is increased significantly.

From Formulas (36) and (37), we find out that it is not difficult for users to maintain a distance longer than 65 cm to see a screen or monitor indoor within a larger, longer and wider environment, in addition to the time when viewing an object at a far distance, so that asoA>8 meters or even higher.

The computation above assumes that the minimum normal optical power Deye of a certain person is equal to 54 Diopters that is obtained from the distance of the diameter (23 mm) of an eyeball minus the thickness and optic center of the Sclera to the surface, and the obtained focal length derived for an equivalent lens is approximately equal to 19 mm, and the diameter of an eyeball varies with age and different individuals. Since the description above analyzes the same eyes in different conditions, therefore different eye Lens movements or reactions will be obtained. The change ratio among different combinations is used as an example for explaining its effect. Now, we will discuss whether or not this system can change the change ratio of the eyes at different axial lengths according to the present invention. Assumed that the minimum optical power Deye of a certain person is equal to 44 Diopters, no Deye related variables can be observed in Formula (28), and thus the results as shown in FIG. 3 will not be affected, but a Deye related variable iExa exists in Formula (31). This variable becomes a numerator for finding the ratio, and the denominator is a constant divisible into constant 1, and thus the result as shown in FIG. 4 will not be affected. We can observe that Deye related variables Deye_s and iE exist in Formula (32), but since 1/iE=minDeye, set Deye=minDeye+xDeye, where xDeye stands for the adjusted optical power of an eye when the object distance is moved from infinite to a nearer distance. Since different individuals have different eyes, and kDeye stands for their difference, and thus the relation of the minimum optical power of a certain eye and the minimum Deye is represented by minDeyeK=minDeye+kDeye, From Formula (32), $soA = 1/(Deye - Dlns + Dlns\_c - 1/iE)$ $= 1/(minDeye + xDeye - Dlns\_c - minDeye)$ $= 1/((minDeye + kDeye) +$ $Deye - Dlns + Dlns\_c - (minDeye + kDeye))$ $= 1/(minDeyeK + xDeye - Dlns + Dlns\_c - minDeyeK)$ From the description above, we can observe that even if the eyes vary with different individuals and the eyes have different minimum optical power or different axial lengths, the derivation of soA still will not be affected, and thus the results as shown in FIGS. 5 and 6 will not be affected. In Formula (8), (31) and (35), we can observe that the Deye related variables iE and iExa exist as the numerator and denominator of Formula (35), but the position of the final image remains unchanged for the same eye at the axial length, before or after an adjustment of the lens is made. The position of the final image is a constant divisible into constant 1, and thus the results in FIGS. 7 and 8 will not be affected. The foregoing observation matches with the computations made by substituting 44 Diopters into the related formulas, and the result also matches with the original data. It shows that the results of the present invention are the same for the corresponding operations of different eyes, and the difference and error of the axial length will not change the results of the computation.

The results of the foregoing computation match with the actual experiments, and thus lens A and B do not have arbitrary values, but they are designed to cope with different conditions. The present invention can be used and designed to fit a person after the user's need is fully understood, and thus the user can clearly see objects and control an appropriate habit for using eyes. The effect of the near lens B is to compensate the ability of a myopic person to see a farther object. Without the help of the near lens B, a myopic person cannot obtain an appropriate vision correction, and all in a sudden a far object looks more blurred to the person, and thus affecting the person's learning, working and living conditions. Although the traditional fogging technique works, some of the users may feel burred everywhere and cannot see things clearly. Particularly for a myopic person with a certain level of myopia, simply adding a lens A according to the traditional fogging technique does not help at all, and the effect is very unstable. Since there is no DBe, many distance ranges cannot be converted appropriately to control the involuntary Ciliary Muscles in order to focus a far object. Since the focusing is not fully utilized, information cannot be obtained normally and users will give up such technique easily in a short time.

The invention primarily provides d(Dlns_c)/d(oA) in the curve of "Lens optical power change/object distance change versus object distance", which is equal to d(Deye_c)/d(oA) to improve the Ciliary Body and the original different moving habit, and this point has been observed from the data above.

If the traditional vision correction methods are used to directly reduce the degrees and relax the muscle tension, then the method will immediately affect the user's learning, working and living conditions. We can also verify this with above combination C. With traditional vision correction methods, the equivalent visual environment is still compressed although the compression is less with a minus reduced optical power traditional lens. Thus, such vision correction methods do not have a significant effect on pseudomyopia or an advantage for improving the magnification.

If necessary, the present invention can adopt a bifocal or multi-focal lens or add a converging lens (or a convex lens) to enhance the distance conversion for a near object and improve the distance change percentage, as well as giving consideration to the vision for a far object.

In addition, the present invention can enlarge an object to give a better level of recognition to an object for the vision, so that users may not want to observe the detail of an object by getting closer to the object, and the image produced on the Retina seems to be bigger and farther, which is very advantageous for the eyeballs to focus an object at a far distance. The present invention effectively trains involuntary muscles in a Ciliary Body.

The description above is based on the results measured from the observations of an eye. Now, it is assumed that both eyes are identical, and two lens of the same design are adopted for both eyes. Since a near object observed separately by both eyes seems to be farther away, the user is at a condition of viewing a far object even the object is actually a near object, if xA, xB, DB and DA are controlled properly.

As to those who cannot use contact lenses, these users can shorten the distance xB by attaching the eyes as close as possible to the near lens, and the lens module can be supported by wearing it at the user's head.

Therefore, the features of the vision correction according to the present invention aim at the improvement of a vision problem caused by bad habits and the balance of the involuntary muscle movement of the eyes. Besides correcting the user's focusing, the present invention also provides a learning tool for recovering the user's normal vision through normal learning, working and living conditions, so that the user can clearly see the desired object, while giving consideration to the user's Ciliary Body and Lens, so as to view objects in a range equivalent to a far distance or a larger, longer and wider space. The invention does not aim at any specific object, but it extends a near distance of an object to a farther vision distance for a myopic person. The extension of a near distance to a farther vision distance will establish the habit of viewing an object at a far distance.

The present invention is not limited to the level of the user's myopia Ddis, but it is designed to achieve the expected effects according to the required environmental change and training.

Basically, the lens B is designed with an optical power that can excessively compensate the optical power of a normal naked eye's vision, wherein DB+Ddis=DBe, and both DBe and DB are negative, and |DBe|>=0.2 D (Diopter), and substantially |DA|=|DBe|, and its value is DA=DBe/(xA*DBe−1). The normal eyeball's optical power Deye and Deye_s created by the present invention are not all the same as shown in the graph of the focusing of an object at an object position oA. The so-called substantially |DA|=|DBe| only gives one overlapped area or an area close to an overlapped area for the two different graphs. The areas cannot be overlapped completely, and thus xA is affected significantly. If it is necessary to improve the distance conversion, then DA needs to cope with DBe and DB and does not have an upper limit. In summation, DA>DBe/(xA*DBe−1), and the distance between lens A and lens B is controlled appropriately, and the distance should not be too long that may make the application inconvenient, and the distance should not be too short that may make the control of the conversion percentage difficult. Therefore, xA−xB>1 cm, xA−xB>xBs*10, and (1/DA)>xA−xB, and distance between the lens B and eyes is xBs>=0 mm. If possible, the closer of the eyes to the lens, the better is the effect. Finally, the ratio of "Lens optical power change/object distance change versus object distance" of a person with a normal naked eye's vision as shown in the graph is greater than 1 and the ratio of "final image height/object height versus object distance" of a person with a normal naked eye's vision as shown in the graph curve is greater than 1. The asoA is substantially greater than 4 meters, and its value is as large as possible.

The far lens A is not limited to a bifocal lens or a multi-focal lens, but a converging lens (or convex lens) can be installed close to the lens A. The far lens A is also not limited to the support by a general glasses frame. The near lens B can be any soft or hard contact lenses or any lenses close to the eyeballs. The lenses can be worn at the user's head or supported by the far lens A and the near lens B of the present invention.

The lens module can be designed independently for each eye as needed.

The present invention looks a little complicated, but its final objective is to remove all lenses from a person with a vision problem. For example, it takes about 2 years for a myopic person who adopts the vision correction method of the present invention to reduce the level of myopia by 1 or 1.5 Diopters. For early pseudomyopic persons, it takes about one to three months to reduce the level of myopia by 0.25 to 0.5 Diopters, and thus the present invention is a simple, easy and feasible solution.

The method of the present invention has never been disclosed before, and the invention adopts a non-surgical method to correct a user's focusing and provide a tool for users to recover their normal vision. The invention further allows the user's Ciliary Body and Lens to operate at a range equivalent to seeing an object at a far distance and balance out the old habit, and finally achieve the effect of removing all lenses. There is a significant improvement on the effect and thus the invention fully complies with the patent application requirements.

While the invention has been described by means of specific embodiments, numerous modifications and variations could be made thereto by those skilled in the art without departing from the scope and spirit of the invention set forth in the claims.

TABLE 1

| Lens combination | minDeye + Ddis | DA | DB | DBe | Ddis | xA | oE (= oA) |
| --- | --- | --- | --- | --- | --- | --- | --- |
| A | 54 D | −3.0 D | 3.0 D | 3.0 D | 0 D | 0 cm | Variable |
| Equvalent to #1 of A | 54 D | 3.0 D | −3.0 D | −3.0 D | 0 D | 0 cm | Variable |
| B | 54 D | 3.0 D | −3.0 D | −3.0 D | 0 D | 2 cm | Variable |
| C | 54 D | −3.0 D | 3.0 D | 3.0 D | 0 D | 2 cm | Variable |
| D | 57 D | 0.5 D | −3.5 D | −0.5 D | 3.0 D | 2 cm | Variable |
| E | 57 D | 2.0 D | −3.5 D | −0.5 D | 3.0 D | 2 cm | Variable |

Table 1 lists the settings for different lens combinations mentioned in the specification, where minDeye + Ddis is the assumed minimum diopter of a certain eye.

TABLE 2

| 1 | 2 | 3 | 4 | 5 | 6 | 7 |
| --- | --- | --- | --- | --- | --- | --- |
| oA | Note #1 | Note #2 | Note #3 | Com. A | Com. B | Com. C |
| 0.2 | 111.74% | 90.02% | 124.14% | −2.500E+01 | −2.794E+01 | −2.250E+01 |
| 0.4 | 112.45% | 89.51% | 125.64% | −6.250E+00 | −7.028E+00 | −5.594E+00 |
| 0.6 | 112.69% | 89.34% | 126.14% | −2.778E+00 | −3.130E+00 | −2.482E+00 |
| 0.8 | 112.81% | 89.25% | 126.40% | −1.563E+00 | −1.763E+00 | −1.395E+00 |
| 1.0 | 112.89% | 89.20% | 126.55% | −1.000E+00 | −1.129E+00 | −8.920E−01 |
| 1.2 | 112.93% | 89.17% | 126.65% | −6.944E−01 | −7.843E−01 | −6.192E−01 |
| 1.4 | 112.97% | 89.15% | 126.72% | −5.102E−01 | −5.764E−01 | −4.548E−01 |
| 1.6 | 112.99% | 89.13% | 126.78% | −3.906E−01 | −4.414E−01 | −3.482E−01 |
| 1.8 | 113.02% | 89.11% | 126.82% | −3.086E−01 | −3.488E−01 | −2.750E−01 |
| 2.0 | 113.03% | 89.10% | 126.86% | −2.500E−01 | −2.826E−01 | −2.228E−01 |
| 2.2 | 113.04% | 89.09% | 126.89% | −2.066E−01 | −2.336E−01 | −1.841E−01 |
| 2.4 | 113.05% | 89.08% | 126.90% | −1.736E−01 | −1.963E−01 | −1.547E−01 |
| 2.6 | 113.06% | 89.08% | 126.93% | −1.479E−01 | −1.673E−01 | −1.318E−01 |
| 2.8 | 113.07% | 89.07% | 126.94% | −1.276E−01 | −1.442E−01 | −1.136E−01 |
| 3.0 | 113.08% | 89.06% | 126.96% | −1.111E−01 | −1.256E−01 | −9.896E−02 |
| Note #4 . . . | | | | | | |
| 14.00 | 113.14% | 89.02% | 127.09% | −5.1000E−03 | −5.7700E−03 | −4.5400E−03 |
| 14.20 | 113.10% | 88.91% | 127.21% | −4.9600E−03 | −5.6100E−03 | −4.4100E−03 |
| 14.40 | 113.28% | 89.00% | 127.27% | −4.8200E−03 | −5.4600E−03 | −4.2900E−03 |
| 14.60 | 113.22% | 89.13% | 127.03% | −4.6900E−03 | −5.3100E−03 | −4.1800E−03 |
| 14.80 | 113.13% | 88.84% | 127.34% | −4.5700E−03 | −5.1700E−03 | −4.0600E−03 |
| 15.00 | 113.29% | 89.19% | 127.02% | −4.4400E−03 | −5.0300E−03 | −3.9600E−03 |
| 15.20 | 113.16% | 88.91% | 127.27% | −4.3300E−03 | −4.9000E−03 | −3.8500E−03 |
| 15.40 | 113.03% | 88.86% | 127.20% | −4.2200E−03 | −4.7700E−03 | −3.7500E−03 |
| 15.60 | 113.14% | 89.05% | 127.05% | −4.1100E−03 | −4.6500E−03 | −3.6600E−03 |
| 15.80 | 112.97% | 89.03% | 126.89% | −4.0100E−03 | −4.5300E−03 | −3.5700E−03 |
| 16.00 | 113.04% | 89.00% | 127.01% | −3.9100E−03 | −4.4200E−03 | −3.4800E−03 |

Fields #5, 6 and 7 of Table 2 show the computed data of the change percentage of "Lens diopter change/object distance change − object distance" obtained by computing Formula (28), and Fields #2, 3, 4 show the ratios among them.
Note #1: d(Deye_c)/d(oA) of Combination B divided by d(Deye)/d(oA) of Combination A
Note #2: d(Deye_c)/d(oA) of Combination C divided by d(Deye)/d(oA) of Combination A
Note #3: d(Deye_c)/d(oA) of Combination B divided by d(Deye_c)/d(oA) of Combination C
Note #4: From FIG. 3, we know that the ratios of lens combinations A, B and C tends to be stable, and thus only the data in the later section are listed, and the detail data in the middle are not listed.

TABLE 3

| 1 | 2 | 3 | 4 | 5 | 6 | 7 |
|---|---|---|---|---|---|---|
| oA | Note #5 | Note #6 | Note #7 | Com. A | Com. B | Com. C |
| 0.2 | 105.71% | 94.88% | 111.42% | −9.2593E−02 | −9.7878E−02 | −8.7849E−02 |
| 0.4 | 106.05% | 94.61% | 112.09% | −4.6296E−02 | −4.9095E−02 | −4.3800E−02 |
| 0.6 | 106.16% | 94.52% | 112.32% | −3.0864E−02 | −3.2765E−02 | −2.9172E−02 |
| 0.8 | 106.21% | 94.47% | 112.42% | −2.3148E−02 | −2.4586E−02 | −2.1869E−02 |
| 1.0 | 106.24% | 94.44% | 112.49% | −1.8519E−02 | −1.9675E−02 | −1.7490E−02 |
| 1.2 | 106.27% | 94.43% | 112.54% | −1.5432E−02 | −1.6400E−02 | −1.4572E−02 |
| 1.4 | 106.28% | 94.41% | 112.57% | −1.3228E−02 | −1.4059E−02 | −1.2489E−02 |
| 1.6 | 106.30% | 94.41% | 112.59% | −1.1574E−02 | −1.2303E−02 | −1.0927E−02 |
| 1.8 | 106.31% | 94.40% | 112.61% | −1.0288E−02 | −1.0937E−02 | −9.7120E−03 |
| 2.0 | 106.32% | 94.39% | 112.63% | −9.2590E−03 | −9.8440E−03 | −8.7400E−03 |
| 2.2 | 106.32% | 94.38% | 112.65% | −8.4180E−03 | −8.9500E−03 | −7.9450E−03 |
| 2.4 | 106.32% | 94.39% | 112.65% | −7.7160E−03 | −8.2040E−03 | −7.2830E−03 |
| 2.6 | 106.32% | 94.37% | 112.66% | −7.1230E−03 | −7.5730E−03 | −6.7220E−03 |
| 2.8 | 106.34% | 94.38% | 112.67% | −6.6140E−03 | −7.0330E−03 | −6.2420E−03 |
| 3.0 | 106.33% | 94.38% | 112.67% | −6.1730E−03 | −6.5640E−03 | −5.8260E−03 |
| Note #8 . . . | | | | | | |
| 14.0 | 106.35% | 94.33% | 112.74% | −1.3230E−03 | −1.4070E−03 | −1.2480E−03 |
| 14.2 | 106.37% | 94.33% | 112.76% | −1.3040E−03 | −1.3870E−03 | −1.2300E−03 |
| 14.4 | 106.38% | 94.32% | 112.78% | −1.2860E−03 | −1.3680E−03 | −1.2130E−03 |
| 14.6 | 106.39% | 94.40% | 112.70% | −1.2680E−03 | −1.3490E−03 | −1.1970E−03 |
| 14.8 | 106.39% | 94.40% | 112.70% | −1.2510E−03 | −1.3310E−03 | −1.1810E−03 |
| 15.0 | 106.32% | 94.33% | 112.70% | −1.2350E−03 | −1.3130E−03 | −1.1650E−03 |
| 15.2 | 106.40% | 94.33% | 112.79% | −1.2180E−03 | −1.2960E−03 | −1.1490E−03 |
| 15.4 | 106.32% | 94.35% | 112.69% | −1.2030E−03 | −1.2790E−03 | −1.1350E−03 |
| 15.6 | 106.40% | 94.36% | 112.77% | −1.1870E−03 | −1.2630E−03 | −1.1200E−03 |
| 15.8 | 106.40% | 94.37% | 112.75% | −1.1720E−03 | −1.2470E−03 | −1.1060E−03 |
| 16.0 | 106.40% | 94.38% | 112.73% | −1.1570E−03 | −1.2310E−03 | −1.0920E−03 |

In Table 3, Fields #5, 6 and 7 show the computed data of the percentage of "Final image height/Object height versus Object distance" obtained by computing Formula 31.
Fields #2, 3 and 4 are the ratios among them.
Note #5: rHiExa of Combination B divided by rHiE of Combination A
Note #6: rHiExa of Combination C divided by rHiE of Combination A
Note #7: rHiExa of Combination B divided by rHiExa of Combination C
Note #8: From FIG. 4, we known that the ratios of Combinations A and B tend to be stable, and thus only the data in the later section are listed, and the detail data in the middle are not listed.

TABLE 4

| 1 | 2 | 3 | 4 | 5 |
|---|---|---|---|---|
| oA | Note #9 | Note #10 | Com. A | Com. D |
| 0.200 | 0.200 | 0.196 | 59.000 | 59.091 |
| 0.700 | 0.700 | 0.689 | 55.429 | 55.452 |
| 1.200 | 1.200 | 1.183 | 54.833 | 54.845 |
| 1.700 | 1.700 | 1.681 | 54.588 | 54.595 |
| 2.200 | 2.200 | 2.180 | 54.455 | 54.459 |
| 2.700 | 2.700 | 2.682 | 54.370 | 54.373 |
| 3.200 | 3.200 | 3.187 | 54.313 | 54.314 |
| 3.700 | 3.700 | 3.694 | 54.270 | 54.271 |
| 4.200 | 4.200 | 4.204 | 54.238 | 54.238 |
| 4.700 | 4.700 | 4.716 | 54.213 | 54.212 |
| 5.200 | 5.200 | 5.231 | 54.192 | 54.191 |
| 5.700 | 5.700 | 5.749 | 54.175 | 54.174 |
| 6.200 | 6.200 | 6.269 | 54.161 | 54.160 |
| 6.700 | 6.700 | 6.792 | 54.149 | 54.147 |
| 7.200 | 7.200 | 7.318 | 54.139 | 54.137 |
| 7.700 | 7.700 | 7.846 | 54.130 | 54.127 |
| 8.200 | 8.200 | 8.377 | 54.122 | 54.119 |
| 8.700 | 8.700 | 8.911 | 54.115 | 54.112 |
| 9.200 | 9.200 | 9.447 | 54.109 | 54.106 |
| 9.700 | 9.700 | 9.987 | 54.103 | 54.100 |
| 10.200 | 10.200 | 10.529 | 54.098 | 54.095 |
| 10.700 | 10.700 | 11.074 | 54.093 | 54.090 |
| 11.200 | 11.200 | 11.622 | 54.089 | 54.086 |
| 11.700 | 11.700 | 12.172 | 54.085 | 54.082 |
| 12.200 | 12.200 | 12.726 | 54.082 | 54.079 |
| 12.700 | 12.700 | 13.282 | 54.079 | 54.075 |
| 13.200 | 13.200 | 13.842 | 54.076 | 54.072 |
| 13.700 | 13.700 | 14.404 | 54.073 | 54.069 |
| 14.200 | 14.200 | 14.970 | 54.070 | 54.067 |
| 14.700 | 14.700 | 15.538 | 54.068 | 54.064 |
| 15.200 | 15.200 | 16.110 | 54.066 | 54.062 |
| 15.700 | 15.700 | 16.684 | 54.064 | 54.060 |
| 16.200 | 16.200 | 17.262 | 54.062 | 54.058 |
| 16.700 | 16.700 | 17.843 | 54.060 | 54.056 |
| 17.200 | 17.200 | 18.427 | 54.058 | 54.054 |
| 17.700 | 17.700 | 19.014 | 54.056 | 54.053 |
| 18.200 | 18.200 | 19.604 | 54.055 | 54.051 |
| 18.700 | 18.700 | 20.198 | 54.053 | 54.050 |
| 19.200 | 19.200 | 20.794 | 54.052 | 54.048 |
| 19.700 | 19.700 | 21.394 | 54.051 | 54.047 |
| 20.200 | 20.200 | 21.998 | 54.050 | 54.045 |

In Table 4, Fields #4 and 5 show the computed data of the equivalent diopter (Deye_c-DBe) of different lens combinations computed from Formulas (21), (25) and (26). Fields 2 and 3 show their computed data.
Note #9: Field #4 shows the equivalent diopter obtained from the lens combination A, which is converted into the equivalent vision distance by Formula (32).
Note #10: Field #5 shows the equivalent diopter obtained from the lens combination D, which is converted into the equivalent vision distance by Formula (32).

TABLE 5

| 1 | 2 | 3 | 4 | 5 |
|---|---|---|---|---|
| oA | Note #11 | Note #12 | Com. A | Com. E |
| 0.200 | 0.200 | 0.262 | 59.000 | 57.820 |
| 0.215 | 0.215 | 0.290 | 58.651 | 57.444 |
| 0.230 | 0.230 | 0.321 | 58.348 | 57.117 |

TABLE 5-continued

| 1<br>oA | 2<br>Note #11 | 3<br>Note #12 | 4<br>Com. A | 5<br>Com. E |
|---|---|---|---|---|
| 0.245 | 0.245 | 0.353 | 58.082 | 56.831 |
| 0.260 | 0.260 | 0.388 | 57.846 | 56.577 |
| 0.275 | 0.275 | 0.425 | 57.636 | 56.350 |
| 0.290 | 0.290 | 0.466 | 57.448 | 56.148 |
| 0.305 | 0.305 | 0.509 | 57.279 | 55.965 |
| 0.320 | 0.320 | 0.556 | 57.125 | 55.799 |
| 0.335 | 0.335 | 0.607 | 56.985 | 55.648 |
| 0.350 | 0.350 | 0.662 | 56.857 | 55.510 |
| 0.365 | 0.365 | 0.723 | 56.740 | 55.383 |
| 0.380 | 0.380 | 0.790 | 56.632 | 55.266 |
| 0.395 | 0.395 | 0.864 | 56.532 | 55.158 |
| 0.410 | 0.410 | 0.945 | 56.439 | 55.058 |
| 0.425 | 0.425 | 1.037 | 56.353 | 54.965 |
| 0.440 | 0.440 | 1.139 | 56.273 | 54.878 |
| 0.455 | 0.455 | 1.255 | 56.198 | 54.797 |
| 0.470 | 0.470 | 1.387 | 56.128 | 54.721 |
| 0.485 | 0.485 | 1.538 | 56.062 | 54.650 |
| 0.500 | 0.500 | 1.715 | 56.000 | 54.583 |
| 0.515 | 0.515 | 1.922 | 55.942 | 54.520 |
| 0.530 | 0.530 | 2.170 | 55.887 | 54.461 |
| 0.545 | 0.545 | 2.472 | 55.835 | 54.405 |
| 0.560 | 0.560 | 2.846 | 55.786 | 54.351 |
| 0.575 | 0.575 | 3.322 | 55.739 | 54.301 |
| 0.590 | 0.590 | 3.950 | 55.695 | 54.253 |
| 0.605 | 0.605 | 4.815 | 55.653 | 54.208 |
| 0.620 | 0.620 | 6.082 | 55.613 | 54.164 |
| 0.635 | 0.635 | 8.117 | 55.575 | 54.123 |
| 0.650 | 0.650 | 11.924 | 55.538 | 54.084 |

In Table 5, Fields #4 and 5 show the computed data of the equivalent diopter (Deye_c-DBe) of different lens combinations computed from Formulas (21), (25) and (26). Fields 2 and 3 show their computed data.
Note #11: Field #4 shows the equivalent diopter obtained from the lens combination A, which is converted into the equivalent vision distance by Formula (32).
Note #12: Field #5 shows the equivalent diopter obtained from the lens combination E, which is converted into the equivalent vision distance by Formula (32).

TABLE 6

| 1<br>oA | 2<br>Note #13 | 3<br>Com. A | 4<br>Com. D |
|---|---|---|---|
| 0.20 | 101.90% | −9.259E−02 | −9.605E−02 |
| 0.70 | 102.40% | −2.646E−02 | −2.752E−02 |
| 1.20 | 102.60% | −1.543E−02 | −1.606E−02 |
| 1.70 | 102.90% | −1.089E−02 | −1.134E−02 |
| 2.20 | 103.20% | −8.420E−03 | −8.760E−03 |
| 2.70 | 103.50% | −6.860E−03 | −7.140E−03 |
| 3.20 | 103.70% | −5.790E−03 | −6.030E−03 |
| 3.70 | 104.00% | −5.010E−03 | −5.210E−03 |
| 4.20 | 104.20% | −4.410E−03 | −4.590E−03 |
| 4.70 | 104.50% | −3.940E−03 | −4.100E−03 |
| 5.20 | 104.80% | −3.560E−03 | −3.710E−03 |
| 5.70 | 105.00% | −3.250E−03 | −3.380E−03 |
| 6.20 | 105.30% | −2.990E−03 | −3.110E−03 |
| 6.70 | 105.60% | −2.760E−03 | −2.880E−03 |
| 7.20 | 105.90% | −2.570E−03 | −2.680E−03 |
| 7.70 | 106.10% | −2.410E−03 | −2.500E−03 |
| 8.20 | 106.40% | −2.260E−03 | −2.350E−03 |
| 8.70 | 106.70% | −2.130E−03 | −2.220E−03 |
| 9.20 | 107.00% | −2.010E−03 | −2.100E−03 |
| 9.70 | 107.20% | −1.910E−03 | −1.990E−03 |
| 10.20 | 107.50% | −1.820E−03 | −1.890E−03 |
| 10.70 | 107.80% | −1.730E−03 | −1.800E−03 |
| 11.20 | 108.10% | −1.650E−03 | −1.720E−03 |
| 11.70 | 108.40% | −1.580E−03 | −1.650E−03 |
| 12.20 | 108.60% | −1.520E−03 | −1.580E−03 |
| 12.70 | 108.90% | −1.460E−03 | −1.520E−03 |
| 13.20 | 109.20% | −1.400E−03 | −1.460E−03 |
| 13.70 | 109.50% | −1.350E−03 | −1.410E−03 |
| 14.20 | 109.80% | −1.300E−03 | −1.360E−03 |
| 14.70 | 110.10% | −1.260E−03 | −1.310E−03 |
| 15.20 | 110.40% | −1.220E−03 | −1.270E−03 |

TABLE 6-continued

| 1<br>oA | 2<br>Note #13 | 3<br>Com. A | 4<br>Com. D |
|---|---|---|---|
| 15.70 | 110.70% | −1.180E−03 | −1.230E−03 |
| 16.20 | 111.00% | −1.140E−03 | −1.190E−03 |
| 16.70 | 111.30% | −1.110E−03 | −1.160E−03 |
| 17.20 | 111.60% | −1.080E−03 | −1.120E−03 |
| 17.70 | 111.90% | −1.050E−03 | −1.090E−03 |
| 18.20 | 112.20% | −1.020E−03 | −1.060E−03 |
| 18.70 | 112.50% | −9.903E−04 | −1.030E−03 |
| 19.20 | 112.80% | −9.645E−04 | −1.000E−03 |
| 19.70 | 113.10% | −9.400E−04 | −9.792E−04 |
| 20.20 | 113.40% | −9.168E−04 | −9.549E−04 |

In Table 6, Fields #3 and 4 show the computed data of the percentage of "Final image height/Object height versus Object distance" for different lens combinations obtained by computing Formula (31).
Field #2 shows their computed data as follows.
Note #13: Field #4 shows the percentage of "Final image height/Object height versus Object distance" of the lens combination D, which is converted into the ratio of equivalent vision height by computing Formula (35), wherein soA comes from Field #3 of Table 4.

TABLE 7

| 1<br>oA | 2<br>Note #14 | 3<br>Com. A | 4<br>Com. E |
|---|---|---|---|
| 0.20 | 135.80% | −9.259E−02 | −9.605E−02 |
| 0.22 | 140.10% | −8.613E−02 | −8.938E−02 |
| 0.23 | 144.80% | −8.052E−02 | −8.357E−02 |
| 0.25 | 149.70% | −7.559E−02 | −7.847E−02 |
| 0.26 | 155.00% | −7.123E−02 | −7.396E−02 |
| 0.28 | 160.70% | −6.734E−02 | −6.993E−02 |
| 0.29 | 166.80% | −6.386E−02 | −6.633E−02 |
| 0.31 | 173.40% | −6.072E−02 | −6.307E−02 |
| 0.32 | 180.50% | −5.787E−02 | −6.013E−02 |
| 0.34 | 188.30% | −5.528E−02 | −5.744E−02 |
| 0.35 | 196.70% | −5.291E−02 | −5.498E−02 |
| 0.37 | 205.90% | −5.074E−02 | −5.273E−02 |
| 0.38 | 216.10% | −4.873E−02 | −5.065E−02 |
| 0.40 | 227.30% | −4.688E−02 | −4.873E−02 |
| 0.41 | 239.70% | −4.517E−02 | −4.695E−02 |
| 0.43 | 253.50% | −4.357E−02 | −4.530E−02 |
| 0.44 | 269.10% | −4.209E−02 | −4.376E−02 |
| 0.46 | 286.70% | −4.070E−02 | −4.232E−02 |
| 0.47 | 306.70% | −3.940E−02 | −4.097E−02 |
| 0.49 | 329.80% | −3.818E−02 | −3.971E−02 |
| 0.50 | 356.60% | −3.704E−02 | −3.852E−02 |
| 0.52 | 388.20% | −3.596E−02 | −3.740E−02 |
| 0.53 | 425.90% | −3.494E−02 | −3.634E−02 |
| 0.55 | 471.70% | −3.398E−02 | −3.534E−02 |
| 0.56 | 528.50% | −3.307E−02 | −3.440E−02 |
| 0.58 | 601.00% | −3.221E−02 | −3.350E−02 |
| 0.59 | 696.40% | −3.139E−02 | −3.265E−02 |
| 0.61 | 827.80% | −3.061E−02 | −3.184E−02 |
| 0.62 | 1020.40% | −2.987E−02 | −3.107E−02 |
| 0.64 | 1329.80% | −2.916E−02 | −3.034E−02 |
| 0.65 | 1908.40% | −2.849E−02 | −2.964E−02 |

In Table 7, Fields #3 and 4 show the computed data of the percentage of "Final image height/Object height versus Object distance" for different lens combinations obtained by computing Formula (31).
Field #2 shows their computed data as follows.
Note #14: Field #4 shows the percentage of "Final image height/Object height versus Object distance" of the lens combination E, which is converted into the ratio of equivalent vision height by computing Formula (35), wherein soA comes from Field #3 of Table 5.

What is claimed is:

1. A multi-lens vision correction method and its apparatus thereof, that adopts a basic structure with a lens module comprised of a far lens and a near lens with an appropriate distance apart, and said far lens is a converging lens, and said near lens is a divergent lens, and said near lens compensates insufficient optical power for a normal naked eye and includes an excessive compensation value, and the optical power of said excessive compensation is a negative value, and the absolute value of said excessive compensation is over 0.2 Diopter, and the value of said far lens is DA>DBe/(xA*DBe−1), wherein DA is the optical power of said far lens with a unit in Diopter, DBe is an excessive optical power compensation value with a unit in Diopter of said near lens, xA is an optic center distance with a unit in meter of said far lens and an eye, and the smaller the distance between said near lens and said eye, the better is the effect, and the distance between the optic centers of said far lens and said near lens is controlled to be smaller than the reciprocal of the optical power of said far lens which is its focal length and substantially greater than 1 cm as well as greater than ten times of the distance between said near lens and the surface of said eye.

2. The multi-lens myopia correction method and its apparatus of claim 1, wherein said user observes an object with a preferable average vision distance substantially exceeding four meters.

3. The multi-lens myopia correction method and its apparatus of claim 1, wherein said far lens is a bifocal lens or a multifocal lens.

4. The multi-lens myopia correction method and its apparatus of claim 1, further comprising a converging lens installed at a position close to said far lens.

* * * * *